United States Patent [19]
Setty et al.

[11] Patent Number: 5,142,745
[45] Date of Patent: Sep. 1, 1992

[54] DROP WIRE CLAMP

[75] Inventors: Thim Setty, Edison; Gene Coll, Cranford, both of N.J.

[73] Assignee: Diamond Communication Products, Inc., Garwood, N.J.

[21] Appl. No.: 673,530

[22] Filed: Mar. 22, 1991

[51] Int. Cl.[5] ............................................. F16G 11/04
[52] U.S. Cl. ................................. 24/136 R; 24/115 M
[58] Field of Search ..................... 24/136 R, 115 M; 403/211, 314, 374, 409.1; 248/316.2, 231.3, 74.1

[56] References Cited

U.S. PATENT DOCUMENTS

| | | | |
|---|---|---|---|
| 1,793,140 | 2/1931 | Sternmager | 24/136 R |
| 4,209,661 | 6/1980 | Pate et al. | 24/136 R X |
| 4,430,523 | 2/1984 | Hages | 24/136 R X |
| 4,872,626 | 10/1989 | Lienart | 24/136 R X |
| 4,939,821 | 7/1990 | Frank, Jr. | 24/136 R |

FOREIGN PATENT DOCUMENTS 45010  3/1928  Norway ............................ 24/136 R

*Primary Examiner*—James R. Brittain
*Attorney, Agent, or Firm*—Wegner, Cantor, Mueller & Player

[57] ABSTRACT

A drop wire clamp is disclosed having dimples disposed in longitudinal rows along the length of the shim. Alternatively, transverse ridges may be formed on the shim instead of dimples. Furthermore, the shim may be held captive within the shell so that the shell is a convenient one-piece unit.

9 Claims, 6 Drawing Sheets

DROP WIRE CLAMP

FIELD OF THE INVENTION

The present invention relates to a drop wire clamp for use with telephone drop wires and, more particularly, to a drop wire clamp which can accommodate new six pair drop wire cables as well as conventional two pair cables, and which may include a captive shim therein.

BACKGROUND OF THE INVENTION

Drop wire clamps are used to secure a telephone drop wire from a pole mounted strand to a customer's premises. Known clamps, such as that manufactured and sold by Diamond Communication Products, Garwood, N.J., include a wedge assembly having an assembled bail wire, a shell in which the wedge assembly is received, and a shim which is inserted by the installer through a longitudinal slot in the shell, between the wedge and the cable, so as to protect the cable from the wedge and to help maintain the cable in place.

One difficulty which arises with these typical drop wire clamps is that they are too narrow to accommodate the new 6 pair drop wire cables recently introduced in the telephone market. Further, these known drop wire clamps are inconvenient for the installer, since the installer must carry three pieces—the two-piece clamp itself and the shim. Since the installation often takes place high off the ground, it is dangerous to have the installer fumbling for a separate shim with one hand while holding the cable within the shell with the other hand.

Although it is known to provide small circular dimples on the shim, these dimples do not deform the cable sufficiently to provide any enhanced gripping action.

Okura Electric Industry of Tokyo, Japan sells a drop wire clamp wherein the wedge and shell are connected by a hinge to form a one-piece unit and prevent the wedge from falling out during installation. However, this structure is cumbersome and does not include a protective shim.

SUMMARY OF THE INVENTION

The present invention provides a drop wire clamp having dimples disposed in longitudinal rows along the length of the shim. Alternatively, transverse ridges may be formed on the shim. In this way, the clamp of the present invention grips the cable better than conventional clamps do. Furthermore, the shim and shell may be provided with means for pivoting the shim within the shell while holding the shim "captive" within the shell. In this way, the shim is installed within the shell into a "one-piece unit" prior to the installer travelling to the site, thus reducing the number of separate parts which the installer must handle, thereby increasing installation efficiency.

BRIEF DESCRIPTION OF THE DRAWINGS

These and other aspects of the invention are apparent from the following drawings, in which.

DETAILED DESCRIPTION OF THE PREFERRED EMBODIMENTS

Figure 1:
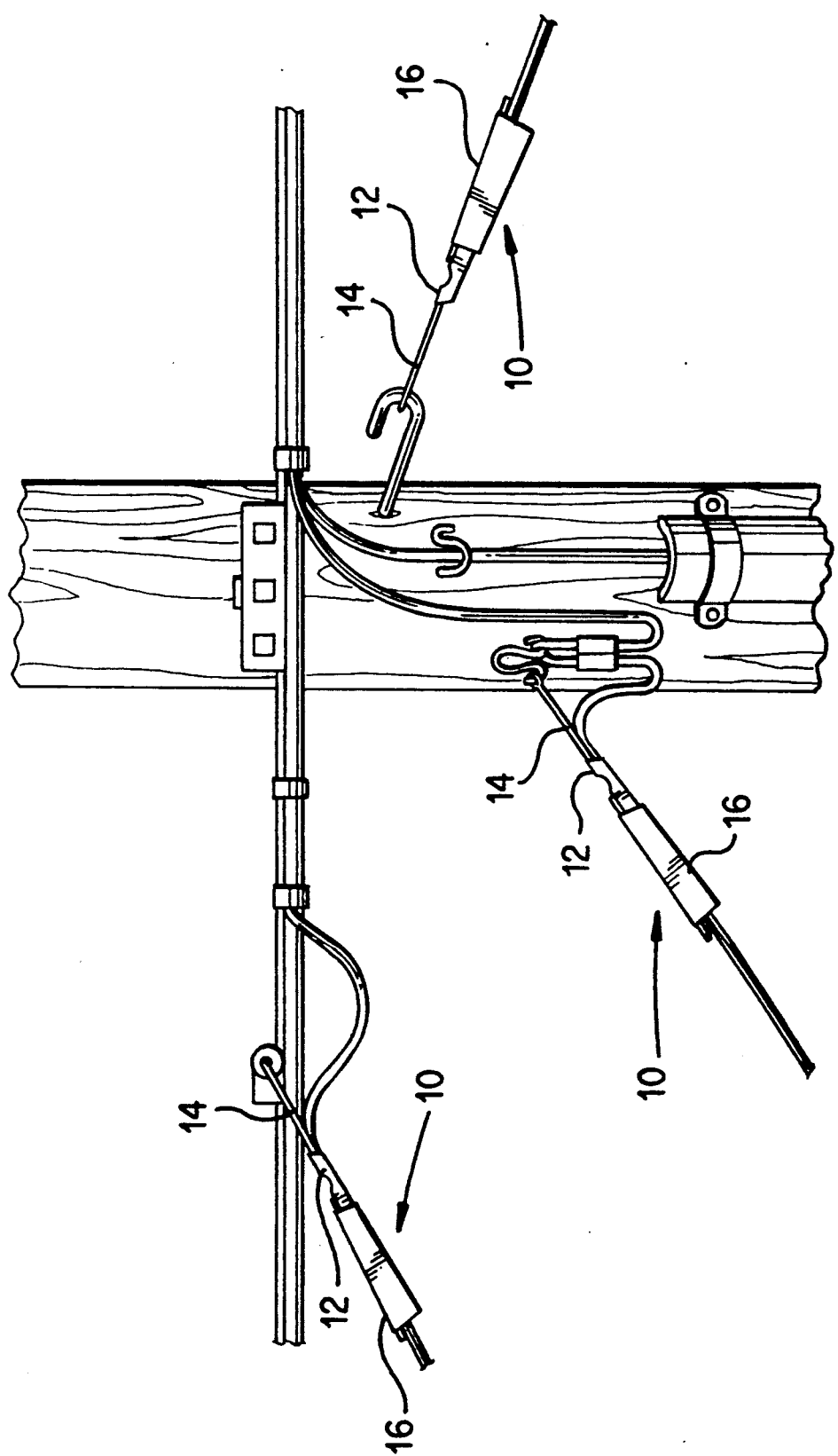
FIG. 1 is a schematic view showing various drop wire clamp arrangements on a telephone pole.

The present invention is directed a drop wire clamp, as shown schematically in FIG. 1 and generally designated 10. Throughout the figures, like numerals will be used to represent like elements.

Figure 2:
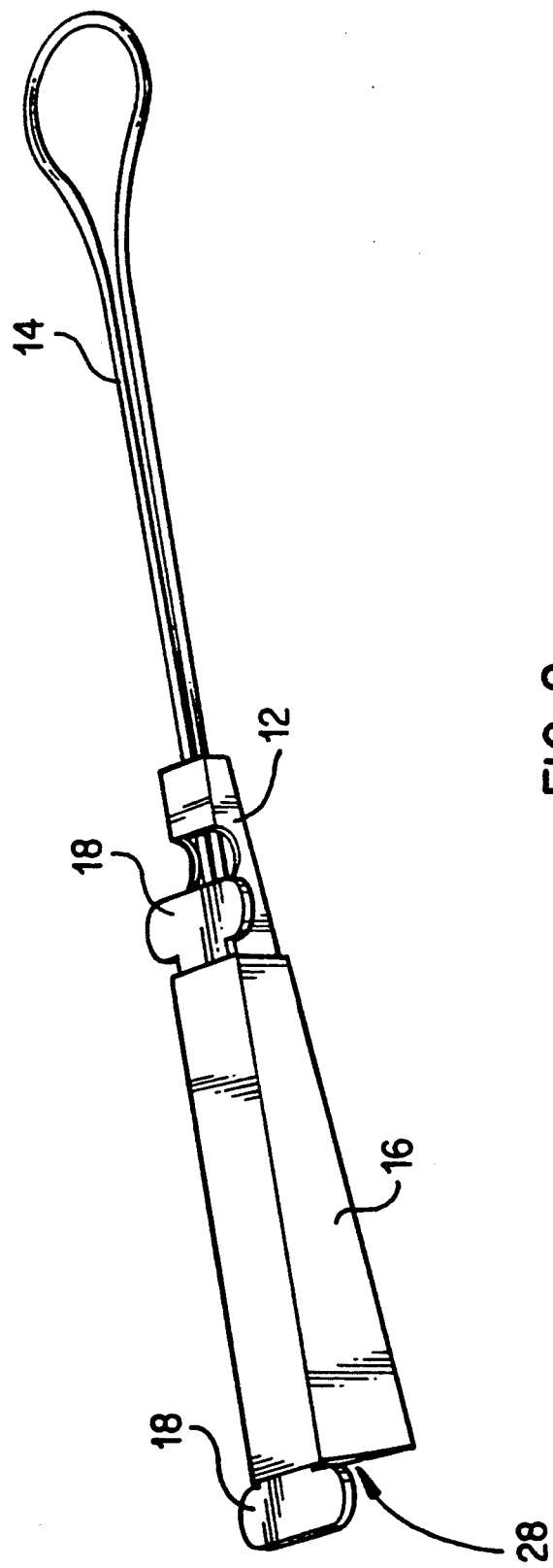
FIG. 2 is a perspective view of a prior art drop wire clamp.

As can be seen in FIG. 1, drop wire clamp 10 is used to secure a telephone drop wire from a pole mounted strand to a customer's premises. Drop wire clamp 10 generally includes wedge assembly 12 having bail wire 14 inserted therein, shell 16 which receives wedge assembly 12 therein, and shim 18 (shim 18 is not particularly shown in FIG. 1, although both ends of shim 18 can be seen protruding from shell 16 in FIG. 2).

Wedge assembly 12, shell 16 and shim 18 are preferably formed of either aluminum or stainless steel, although other suitable materials which can withstand the outdoor elements can be used. Bail wire 14 is generally made of stainless steel, although other materials having sufficient tensile strength and ruggedness can be used. Strain relief for the cable is provided by the bail wire which supports any tensile load so that the load is not carried by the cable itself.

Figure 3:
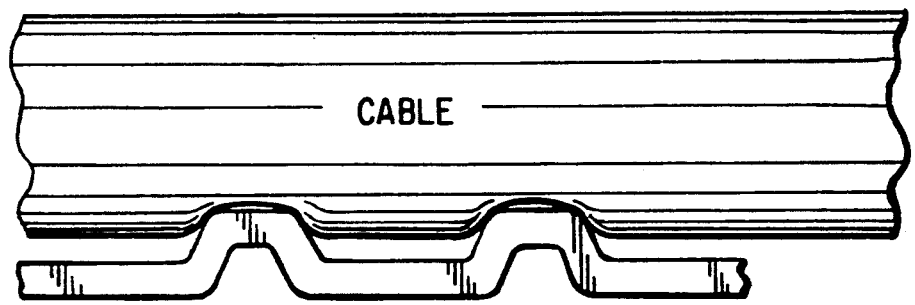
FIG. 3 is an enlarged, partial side view of a dimpled shim in accordance with one aspect of the invention.
Figure 4:
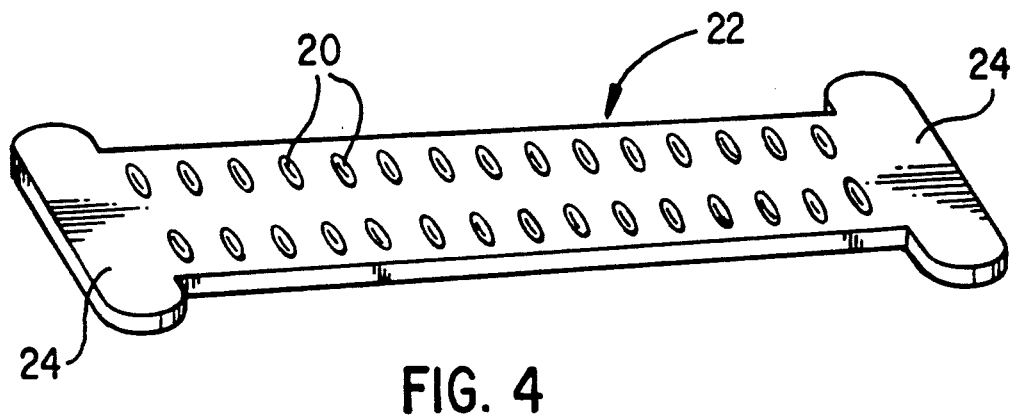
FIG. 4 is a perspective view of a shim in accordance with a preferred embodiment of the invention illustrated in FIG. 3.
Figure 5:
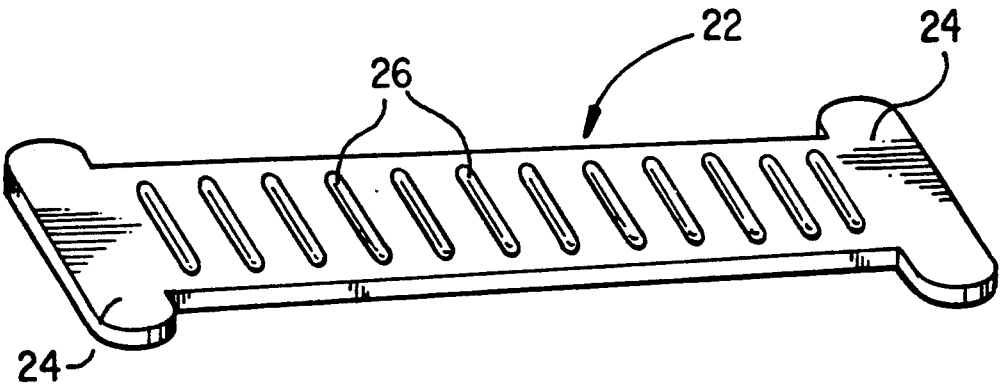
FIG. 5 is a perspective view of a shim in accordance with another preferred embodiment of the invention illustrated in FIG. 3.

As shown in FIGS. 3-5, one aspect of the present invention includes dimples or ribs provided on shim 18. A first preferred embodiment of shim 18 shown in FIG. 4 includes a plurality of elliptical dimples 20 preferably disposed in longitudinal rows along the mid-portion 22 of the shim between the two end portions 24. Although dimples 20 are illustrated as being oblong-shaped, it is to be understood that any suitably-shaped dimples may be used. In one example, the dimples are oblong-shaped and are 0.070 inches wide, 0.120 inches long and 0.030 inches high, and the rows of dimples are spaced 0.156 inches (5/32 of an inch) apart.

In the preferred embodiment illustrated in FIG. 4, the center portion between the rows is free of dimples. This allows the clamp to be used with certain cable having copper conductors running along its central axis, such as that sold by General Cable Company. In this type of cable, the relatively fragile conductors are not well cushioned by the surrounding cover. By leaving the center portion of the shim dimple-free essentially no compressive forces are exerted on the conductors. Of course, if cable is used which does not have such centrally located copper conductors, then the rows of dimples may extend over the entire width of the shim.

Alternatively, a second preferred embodiment of shim 18 is shown in FIG. 5 and includes a plurality of transverse ribs 26 disposed along the mid-portion 22 of the shim. In one example, the ribs are 0.070 inches wide, 0.375 inches long and 0.030 inches deep. The ribs As shown in FIG. 3, either dimples 20 or ribs 26 deform the drop wire cable, thus facilitating a more secure grip on the drop wire cable. Shim 18 having ribs 26, as used in the second preferred embodiment shown in FIG. 5, is particularly advantageous because it provides gripping action across essentially the entire width of the shim, and hence is particularly useful when installing the wider, six pair drop wire cables. Of course, a shim in accordance with the second preferred embodiment may also be used with conventional two pair drop wire cables.

A shim in accordance with either these first or second preferred embodiments may be installed in the conventional manner. Once the cable is inserted in the clamp, the shim is inserted through longitudinal slot 30 formed in shell 16 and rotated to bring the shim into a horizontal position. Then the installer inserts the wedge and bail wire assembly and pulls the bail wire, thus displacing the wedge within the shell until the cable is tightly wedged between the wedge assembly and the shell, while being protected by the shim. The dimples or ribs formed on the shim provide a superior grip on the cable so that cable slippage is reduced.

Figure 6:
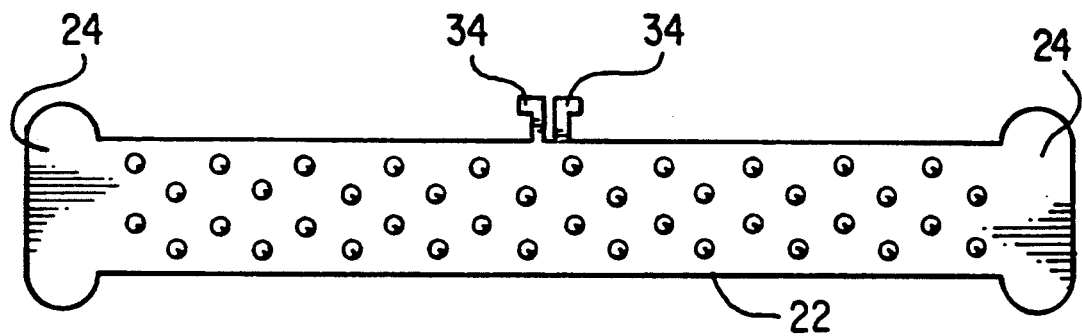
FIG. 6 is a top plan view of a shim in accordance with still another preferred embodiment of the present invention.
Figure 7:
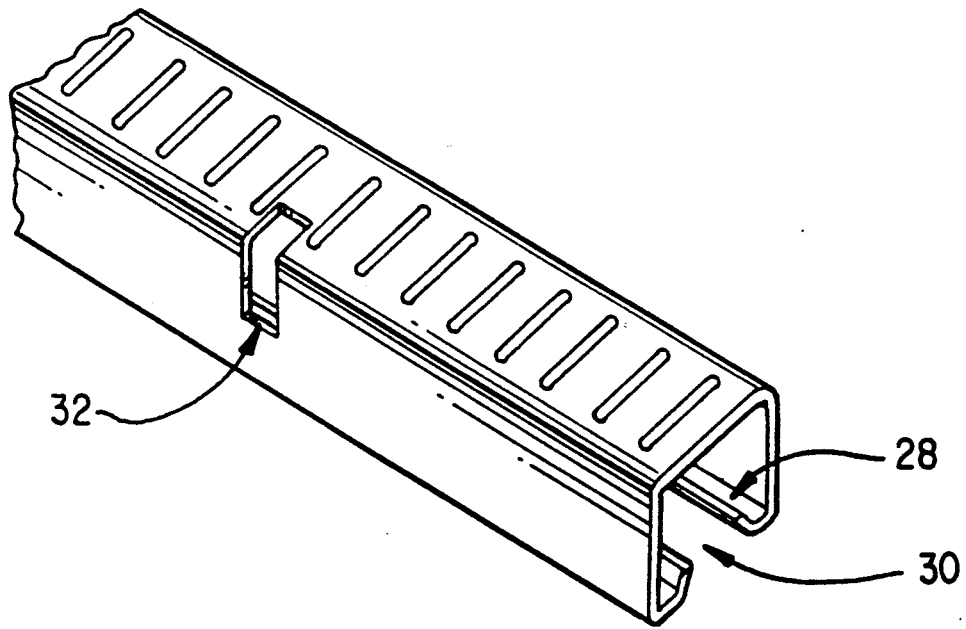
FIG. 7 is a perspective view of a shell for use with the shim illustrated in FIG. 6.
Figure 8:
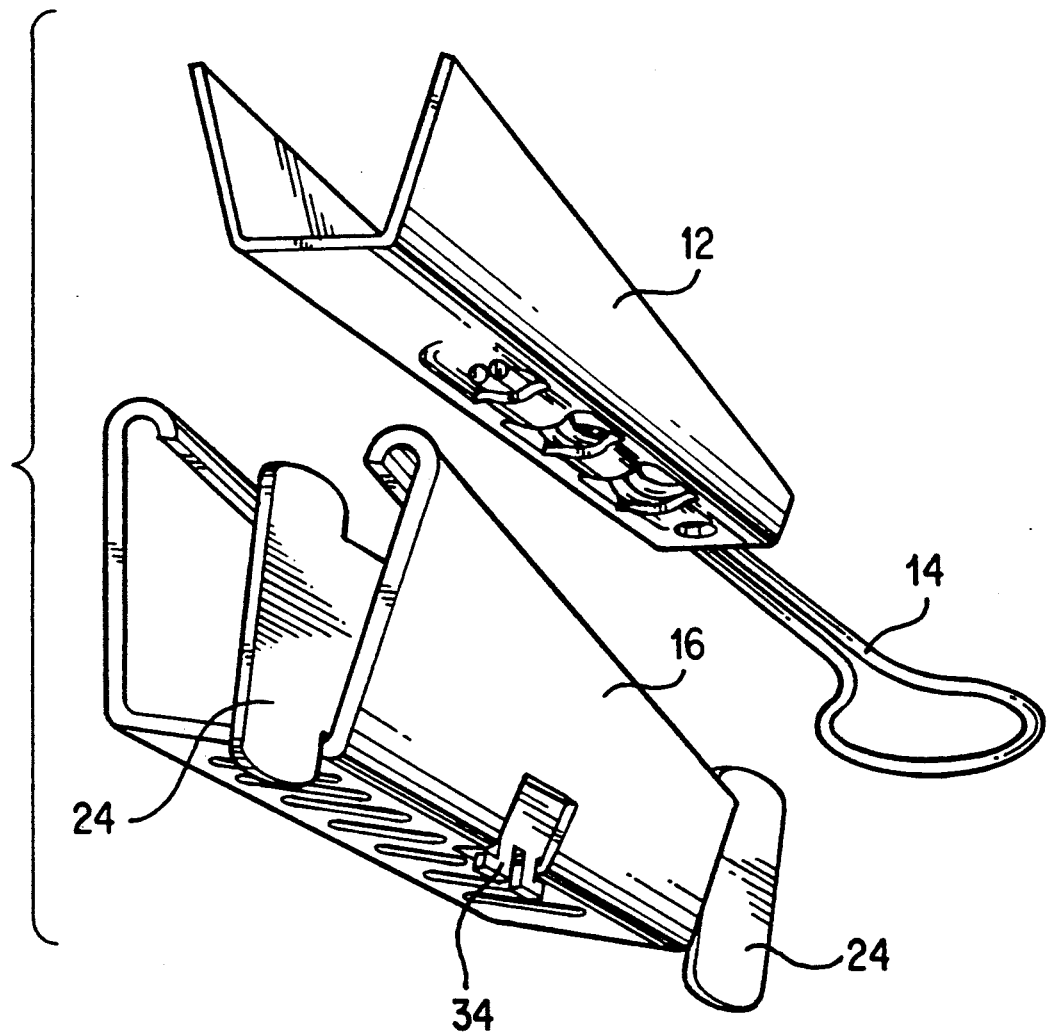
FIG. 8 is a perspective view of a drop wire clamp in accordance with a second aspect of the invention using the shim and shell illustrated in FIGS. 6 and 7.

Another aspect of the invention is illustrated in FIGS. 6-8. Shell 16 generally includes opening 28 formed in each transverse end thereof and a longitudinal slot 30 extending along the bottom surface thereof. According to the invention, shell 16 also includes opening 32 formed in a side wall of the shell for accommodating projections 34 projecting from shim 18 so as to allow shim 18 to pivot within shell 16 without being released therefrom so that the shim is "captive" within the shell. Projections 34 are preferably inverted L-shaped, although any other suitably-shaped projections can be used. Also, projections 34 and opening 32 are preferably formed in the mid-point of the shim and shell, respectively, in order to provide optimum pivoting action, although they may be located closer to one end or the other.

Figure 9A:
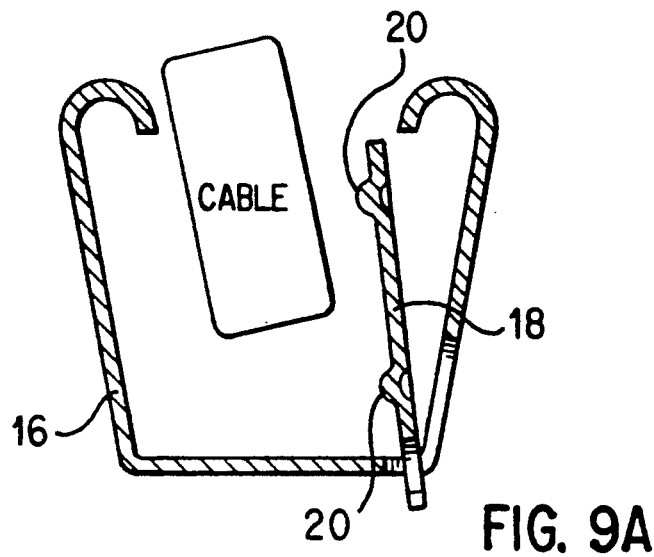
FIG. 9A is a cross-sectional view of the clamp shown in FIG. 8.
Figure 9B:
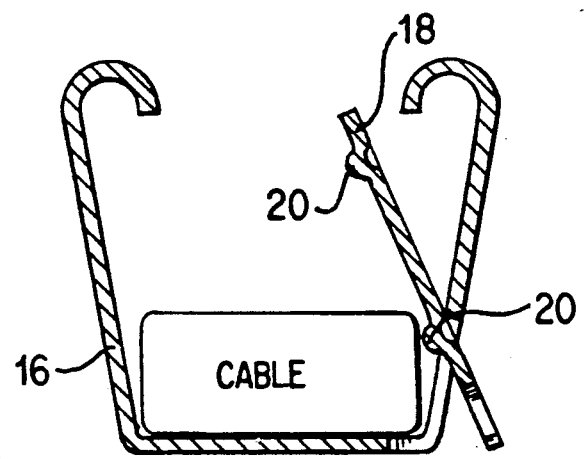
FIG. 9B is a cross-sectional view as shown in FIG. 9A, but with the shim being pivoted back to its horizontal position.
Figure 9C:
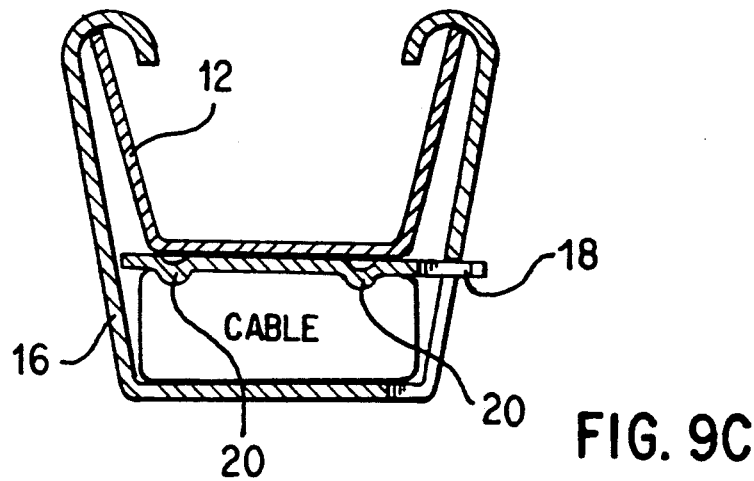
FIG. 9C is a cross-sectional view as shown in FIG. 9B, but with the shim in its horizontal position and the wedge pressed into place.

To install a drop wire clamp in accordance with the second aspect of the invention, the installer pivots shim 18 to the position shown in FIGS. 8 and 9A, and inserts the cable through the shell 16 and out the rear opening 28 of the shell. Once the cable is properly installed in the clamp, the installer pivots shim 18, as shown in FIG. 9B, to the position shown in FIG. 9C, inserts the wedge, fixes the bail wire onto a pole mounted strand or the pole itself and pulls on the bail wire to tighten the wedge against the shim and cable.

Of course, the captive shim may include dimples or ribs in accordance with a first aspect of the invention, as shown in

FIGS. 9A-9C.

The above is for illustrative purposes only. Modification can be made, particularly with regard to matters of shape, size and arrangement of parts, within the scope of the invention as defined by the appended claims. For example, instead a single T-shaped projection 34 projecting from the shim which fits within a T-shaped opening in the shell may be used to facilitate the pivoting action of the shim within the shell.

We claim:

1. A drop wire clamp device, said device comprising:
   a wedge;
   a bail wire protruding from said wedge;
   a shell, said shell having an opening for receiving said wedge;
   a shim, said shim having a plurality of substantially elliptical dimples formed therein, said shim being disposed within said shell, between the wire and the wedge, to maintain the wire in proper position without chafing the wire; and
   pivot means for pivoting said shim within said shell, said pivot means including two inverted L-shaped prongs projecting from a mid-portion of said shim, and an opening formed in a mid-portion of said shell for accommodating said prongs therein, wherein said prongs engage the shell to hold the shim captive in the shell.

2. A device as in claim 1, wherein said dimples are oblong-shaped.

3. A device as in claim 2, wherein a center portion of said shim along its longitudinal length is free of dimples.

4. A device as in claim 2, wherein said dimples are disposed in longitudinal rows.

5. A device as in claim 4, wherein two of said rows are used.

6. A drop wire clamp device, said device comprising:
   a wedge;
   a bail wire protruding from said wedge;
   a shell, said shell having an opening for receiving said wedge;
   a captive shim, said captive shim having a plurality of transverse ribs formed therein, said captive shim being disposed within said shell, between the wire and the wedge, to maintain the wire in proper position without chafing the wire; and
   pivot means for pivoting said captive shim within said shell, said pivot means including two inverted L-shaped prongs projecting from a mid-portion of said captive shim, and an opening formed in a mid-portion of said shell for accommodating said prongs therein.

7. A drop wire clamp device,
   a wedge;
   a bail wire protruding from said wedge;
   a shell, said shell having a longitudinal slot formed in a longitudinal side thereof and an opening formed in each transverse side thereof, said wedge being received in one of said openings;
   a shim held captive within said shell, said shim being placed over the wire once the wire has been threaded through said shell to maintain the wire in proper position without chafing; and
   pivot means for pivoting said shim within said shell, wherein said pivot means comprises a projecting from a mid-portion of said shim, and an opening formed in a mid-portion of said shell for accommodating said projection therein, and wherein said projection includes two inverted L-shaped prongs.

8. A device as in claim 7, wherein said shim is dimpled.

9. A device as in claim 7, wherein said shim is ribbed.

* * * * *